T. E. TURNER.
HAY PRESS.
APPLICATION FILED MAR. 28, 1914.
1,192,959.
Patented Aug. 1, 1916.
2 SHEETS—SHEET 2.
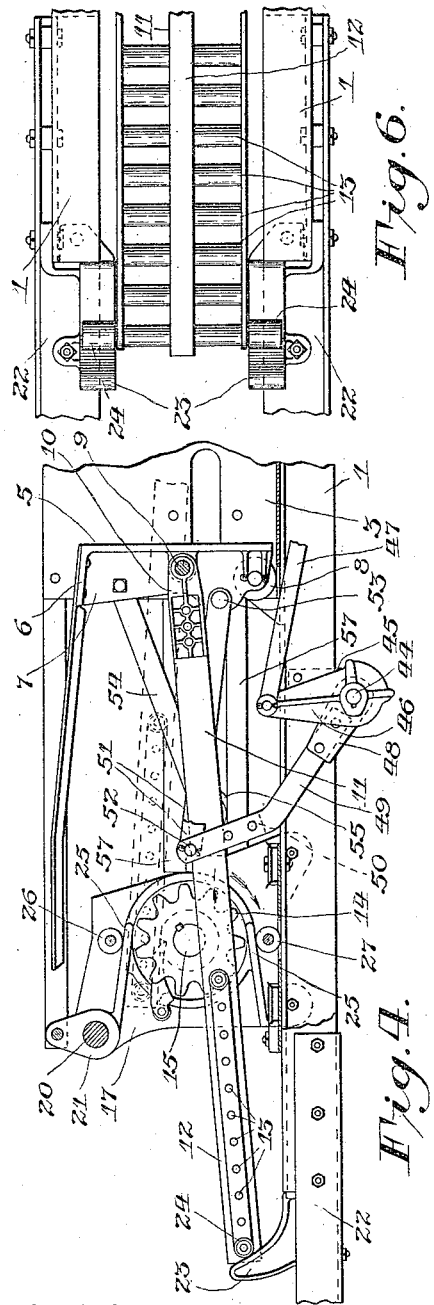
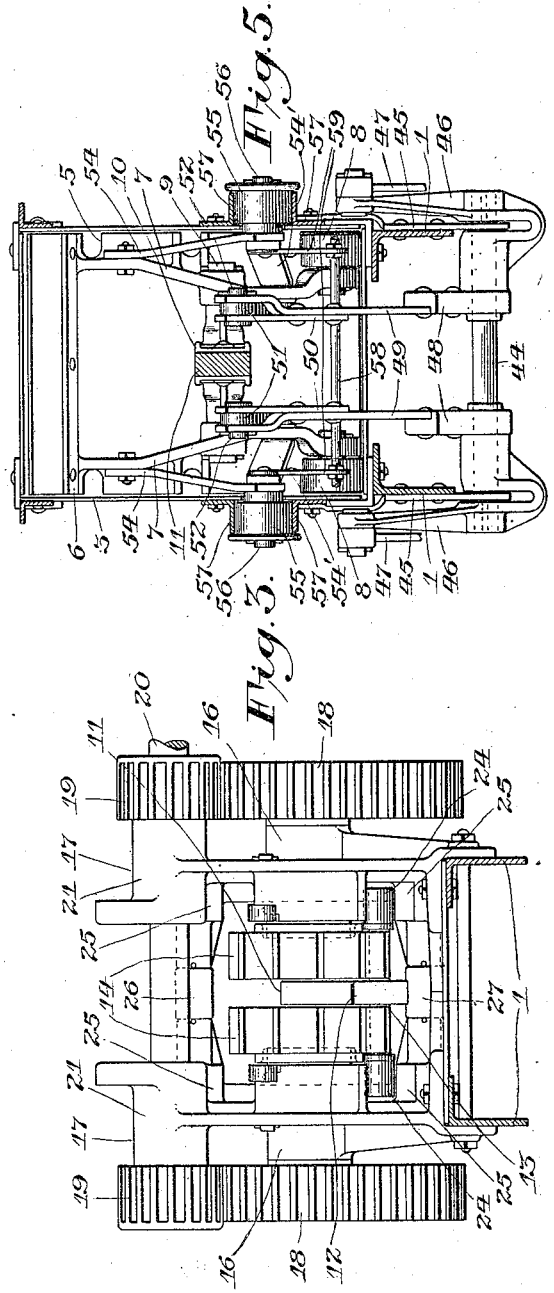
Witnesses:
F. W. Hoffmeister
E. W. Burgess
Inventor:
Thomas E. Turner,
By Chas. E. Lord
Atty.

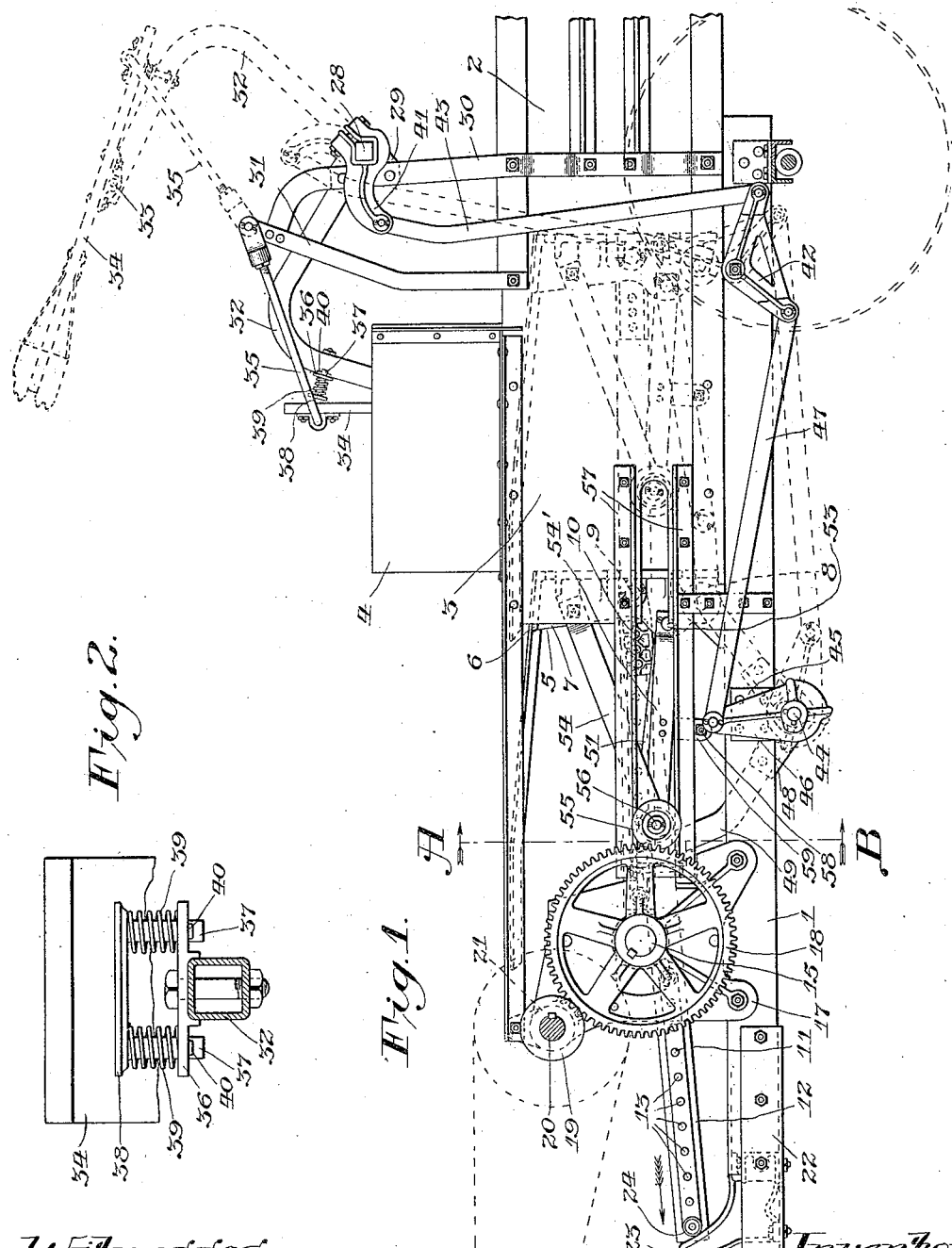

UNITED STATES PATENT OFFICE.

THOMAS E. TURNER, OF SPRINGFIELD, OHIO, ASSIGNOR TO INTERNATIONAL HARVESTER COMPANY OF NEW JERSEY, A CORPORATION OF NEW JERSEY.

HAY-PRESS.

1,192,959.  Specification of Letters Patent.  Patented Aug. 1, 1916.

Application filed March 28, 1914. Serial No. 827,827.

*To all whom it may concern:*

Be it known that I, THOMAS E. TURNER, a citizen of the United States, residing at Springfield, in the county of Clark and State of Ohio, have invented certain new and useful Improvements in Hay-Presses, of which the following is a full, clear, and exact specification.

My invention relates to hay presses.

The objects of the invention are to provide improved means for actuating the feeder through connections with the presser head whereby its movement will be positive and efficient, and simple in its construction, improved means for controlling an orbital movement of the rack that actuates the presser head, and improved means for guiding the presser head in its relation with the frame of the machine. These objects are attained by mechanism, one embodiment of which is illustrated in the accompanying drawings, in which—

Figure 1 is a side elevation of part of a hay press having my invention embodied in its construction; Fig. 2 is a detail part of the self-feeding mechanism; Fig. 3 is a partial end view of the power transmitting mechanism for guiding the orbital path of movement of the presser head actuating rack; Fig. 4 is a longitudinal section of part of Fig. 1; Fig. 5 is a cross section of Fig. 1 along line A—B; and Fig. 6 is a top plan view of part of the rack controlling mechanism.

Referring to the drawings, wherein the same reference characters designate like parts throughout the several views, the base of the main frame comprises parallel side bars 1 upon opposite sides of the machine, 2 the bale chamber, 3 the press chamber, and 4 a feed hopper communicating with the press chamber.

5 represents a reciprocating presser head mounted in the press chamber, and comprises a rib member 6 at its front upper side and downwardly converging rib members 7, having their upper ends connected with the member 6 at their upper ends.

8 represents rollers journaled upon their lower converging ends and adapted to travel upon the base members 1 of the main frame.

9 represents a transverse pin received by openings in the rib member 7 near their middle part, and 10 a rocking coupling member secured to the rear end of a plunger bar 11 and pivoted upon the pin 9, the opposite end of the plunger bar forming a rack bar 12, having oppositely disposed cylindrical teeth 13 forming a part thereof, and engaging with pinions 14 rotatable upon opposite sides of the bar and secured to the inner ends of shafts 15 that are journaled in bearing boxes 16 integral with gear frame members 17, having their lower ends secured to the base frame member 1, and 18 represents power transmitting gears secured to the opposite ends of the shafts and engaging with pinions 19 secured to a driven shaft 20 journaled in bearing boxes 21 integral with the upper ends of the gear frame members 17.

22 represents supplemental base frame members having their rear ends secured to the front ends of the frame members 1, and 23 represents oppositely disposed vertically arranged forwardly inclined cam members secured to the supplemental frame members that engage with rollers 24 carried by the front end of the rack bar 12 in a manner to lift the front end of the bar as it is actuated by the pinions 14 in returning the presser head to the front end of the press chamber, as shown by full lines in Fig. 1.

25 represents fixed guides integral with the gear frame members 17 and adapted to engage with the rollers 24 as they pass the opposite sides of the pinions 14, and 26 and 27 represent upper and lower rollers, respectively, carried by the gear frame members 17 and operative as sustaining guides for the rack bar 12 as it reciprocates above and below the axis of the pinions 14 in its orbital path, and driven continuously thereby in the operation of the machine.

The self-feeder mechanism includes a transverse rock shaft 28 journaled in bearing boxes 29 carried by the upper ends of vertically disposed frame members 30 secured to opposite sides of the front end of the bale chamber, and having their upper ends curved forward and secured to frame members 31 secured to the opposite sides of the press chamber.

32 represents a curved feeder actuating arm having its rear end secured to the rock shaft 28 and its front end pivoted at 33 to a feeder head 34 intermediate its ends, the upper end of the feeder head being connected with the upper end of the frame member 31 by means of longitudinally adjustable links 35 in a manner to maintain the feeder head in a vertical position as the charge is carried from the feed hopper to the feed chamber in a well known way, and 36 represents a transverse bar secured to the curved arm 32 and having openings at its opposite ends that slidably receive stems 37 carried by a connecting bar 38, and 39 represents compression springs encircling the stems and operative between the two bars to yieldingly resist a swinging movement of the upper end of the feeder head 34 when swung upward and absorb the vibration of the feeder head. The stems 37 are held within the openings in the bar 36 by means of pins 40.

41 represents arms secured to opposite ends of the rock shaft 28, and 42 bell crank levers pivotally connected with the base frame members 1 upon opposite sides of the machine and having one arm of each connected with the arms 41 by means of vertically disposed links 43.

44 represents a transversely disposed shaft in front of the press chamber, carried by depending hangers 45 secured to the frame members 1, and 46 arms pivotally mounted upon opposite ends of the shaft 44 and having their free ends connected with the remaining arms of the bell crank levers 42 by means of links 47. Integral with the arms 46 and disposed inside of the frame members 1 are arms 48 having secured thereto the lower ends of bars 49, the opposite ends of the bars having secured thereto clip members 50, spaced apart therefrom at their upper ends and receiving between them the front ends of links 51 that are pivotally connected therewith by means of pins 52, the opposite ends of the links 51 being pivotally connected with the lower ends of the rib members 7 of the presser head by means of pins 53.

54 represents longitudinally arranged bars having their rear ends secured to the upper ends of the rib members 7 of the presser head upon opposite sides thereof and extending forward and downward, and journaled at their front ends are flanged rollers 55 carried by studs 56 secured to the bars, the rollers traveling between longitudinally disposed guide rails 57 spaced apart in parallel relation and secured to opposite sides of the frame of the machine.

58 represents a cross tie member having secured to its opposite ends the lower ends of vertically disposed bars 59, having their upper ends secured to bars 54¹, which in turn have their rear ends secured to the lower ends of ribs 7 and their front ends to the bars 54, the two pairs of bars 54 and 54¹ forming a rigid support for the presser head as it traverses the bale chamber. The tie member 58 tends to hold the flanges of the rollers 55 in contact with the outside of the guide rails 57 and preventing a spreading apart of the bars 54 and 54¹ at their front ends.

In operation the pinions 14 are rotated continuously in a direction indicated by the arrow in Fig. 4, and the rack bar 12 is reciprocated thereby in an orbital path in a manner to cause the presser head 5 to traverse the press chamber in opposite directions, and the cam members 23 engaging with the rollers 24 lift the front end of the bar as its rear end is passed to the upper side of the pinions 14. When the presser head is being drawn toward the front of the press chamber the arms 46 are turned toward the front of the machine by means of their connections with the presser head, and the links 47, connecting the arms with the bell crank levers 42, actuate the latter in a direction to rock the shaft 28 forward and cause the feeder head to descend into the press chamber 3, as shown by full lines in Fig. 1.

Having illustrated and described a preferred form of my invention, I do not wish that it be confined to the specific details of the construction as shown, it being understood that many minor changes may be made in its form without departing from the spirit of the invention.

What I claim as my invention, and desire to secure by Letters Patent, is:

1. In a baling press, the press chamber, a presser head, means for actuating said presser head in opposite directions including a rack having its rear end pivotally connected with said presser head, rotatable pinions operative to reciprocate said rack in an orbital path, and fixed cam tracks operative to lift the free end of the rack as it approaches the front end of the machine.

2. In a baling press, a press chamber, a presser head, means for actuating said presser head in opposite directions including a rack having its rear end pivotally connected with said presser head, rotatable pinions operative to reciprocate said rack in an orbital path, and cam tracks inclining upward and forward and engaging with said rack as it approaches the front end of the machine.

3. In a baling press, a press chamber, a presser head, means for actuating said presser head in opposite directions including a rack having its rear end pivotally connected with said presser head, rotatable pinions operative to reciprocate said rack in an orbital path and transversely alined guiding tracks engaging with opposite sides of the free end of said rack and operative to lift the same as it approaches the front end of the machine.

4. In a hay press, a frame having a chamber therein, a plunger and feeding mechanism movable into said chamber, transversely spaced depending supports beneath said frame, a shaft carried by said supports, double arm crank members pivoted on the opposite ends of said shaft and each having bearings on opposite sides of one of said supports, and link connections between certain of the arms thereof and said plunger and certain others and said feeding mechanism.

5. In a hay press, a press chamber, a bale chamber, a presser head, means for moving it in opposite directions, and means for retaining said head in operative position, said means including guide rails secured to opposite sides of the machine, and bars having their rear ends secured to said head upon opposite sides thereof, and their opposite ends engaging with said guide rails.

6. In a hay press, a press chamber, a bale chamber, a presser head, means for moving the latter in opposite directions, superimposed spaced guide rails secured to opposite sides of the machine, and bars having their rear ends secured to said head on opposite sides thereof, their opposite ends engaging with said guide rails.

7. In a hay press, a frame, a press chamber, a presser head, means for moving the latter in opposite directions, rollers on said head engageable with said frame, bars protruding forwardly from said head, guide rails disposed on opposite sides of said press chamber, and rollers on said bars coöperating with said first mentioned rollers and engageable with said guide rails.

8. In a hay press, a press chamber, a bale chamber, a presser head, means for moving it in opposite directions, and means for retaining said head in operative position, said means including guide rails secured to opposite sides of the machine, and bars having their rear ends secured to said head upon opposite sides thereof, and their opposite ends having flanged rollers thereon engaging with said guide rails.

9. In a hay press, a press chamber, a bale chamber, a presser head, means for moving it in opposite directions, and means for retaining said head in operative position, said means including guide rails secured to opposite sides of the machine, bars having their rear ends secured to said head upon opposite sides thereof and their opposite ends diverging in a vertical plane, the front ends of said bars being connected by means of a cross tie member and having flanged rollers journaled thereon and engaging with said guide rails.

10. In a hay press, a frame, a plunger, means for reciprocating the same thereon, forwardly extending bars attached to opposite sides of said plunger, superimposed spaced guide rails carried on opposite sides of said frame, flanged rollers carried in said bars engageable with said rails, and transversely disposed means connecting said bars for maintaining the flanges on said rollers in proximity to the edges of said rails.

11. In a hay press, a frame having a press chamber therein, a plunger movable in said chamber, an operating member connected to said plunger, means for reciprocating said operating member, and a plurality of bars having their rear ends connected to said plunger at opposite sides of the point of connection of said operating member and their front ends connected together and slidably connected to said frame in front of said plunger.

12. In a hay press, a frame having a press chamber therein, a plunger movable in said chamber, an operating member connected to said plunger, means for reciprocating said operating member, a plurality of pairs of bars having their rear ends pivotally connected at each side of said head and on opposite sides of the point of connection of said operating member and their front ends connected together in front of said plunger, guide rails carried on said frame, and rollers on said bars engageable with said rails.

13. In a hay press, a frame having a press chamber therein, a plunger movable in said chamber, an operating member connected to said plunger, means for reciprocating said operating member, a plurality of forwardly extending bars pivotally connected at each side of said head and above and below the point of connection of said operating member and having their front ends connected together, transverse bracing means between certain of said bars, guide rails carried on said frame, and rollers connected to the ends of said bars engageable with said guide rails.

14. In a hay press, a frame, a rock shaft mounted thereon, an arm movable with said rock shaft, a feeder head operatively connected to said arm, mechanism for rocking said shaft and arm, means for retaining said head in substantially vertical position during its feeding movement, and means resisting a swinging movement of the feeder head with respect to the arm when said arm is moved.

15. In a hay press, a frame, a rock shaft mounted thereon, an arm movable with said rock shaft, a feeder head pivoted to said arm, mechanism for rocking said shaft and arm, and spring mechanism between said arm and head at one side of the pivot of the latter for resisting a swinging movement of the feeder head when said arm is moved.

16. In a hay press, a frame, a rock shaft mounted thereon, an arm movable with said rock shaft, a feeder head operatively connected to said arm, mechanism for rocking said shaft and arm, means for normally retaining said head in vertical position during the feeding operation, and vibration absorbing means between said arm and head.

17. In a hay press, a frame, a rock shaft mounted thereon, an arm movable with said rock shaft, a feeder head pivoted to said arm, mechanism for rocking said shaft and arm, a link connection between said feeder head and said frame, and resilient means operatively connected between said feeder head and said arm.

18. In a hay press, a frame, a rock shaft mounted thereon, an arm movable with said rock shaft, a feeder head pivotally connected at a point intermediate its ends to said arm, mechanism for rocking said shaft and arm, a bracket carried on said arm adjacent the upper end of said head, and compression springs carried on said bracket and operatively connected to said head yieldingly resisting a swinging movement of the latter when said arm is swung upward.

19. In a hay press, a frame, a bale chamber thereon, a rock shaft mounted on said bale chamber, an arm movable with said rock shaft, a feeder head operatively connected at a point intermediate its ends to said arm, mechanism for rocking said shaft and arm, a member fixed to said arm, a bracket carried on said feeder head having studs slidable in openings in said member, and compression springs surrounding said studs and interposed between said bracket and said member.

In testimony whereof I affix my signature, in the presence of two witnesses.

THOMAS E. TURNER.

Witnesses:
R. M. HOLLENBECK,
W. B. KENDIG.

Copies of this patent may be obtained for five cents each, by addressing the "Commissioner of Patents, Washington, D. C."